Feb. 4, 1941. L. CHEVREAU 2,230,935
ENDLESS CHAIN
Filed April 6, 1938 2 Sheets-Sheet 1

Inventor
Lucien Chevreau
By B. Singer, atty.

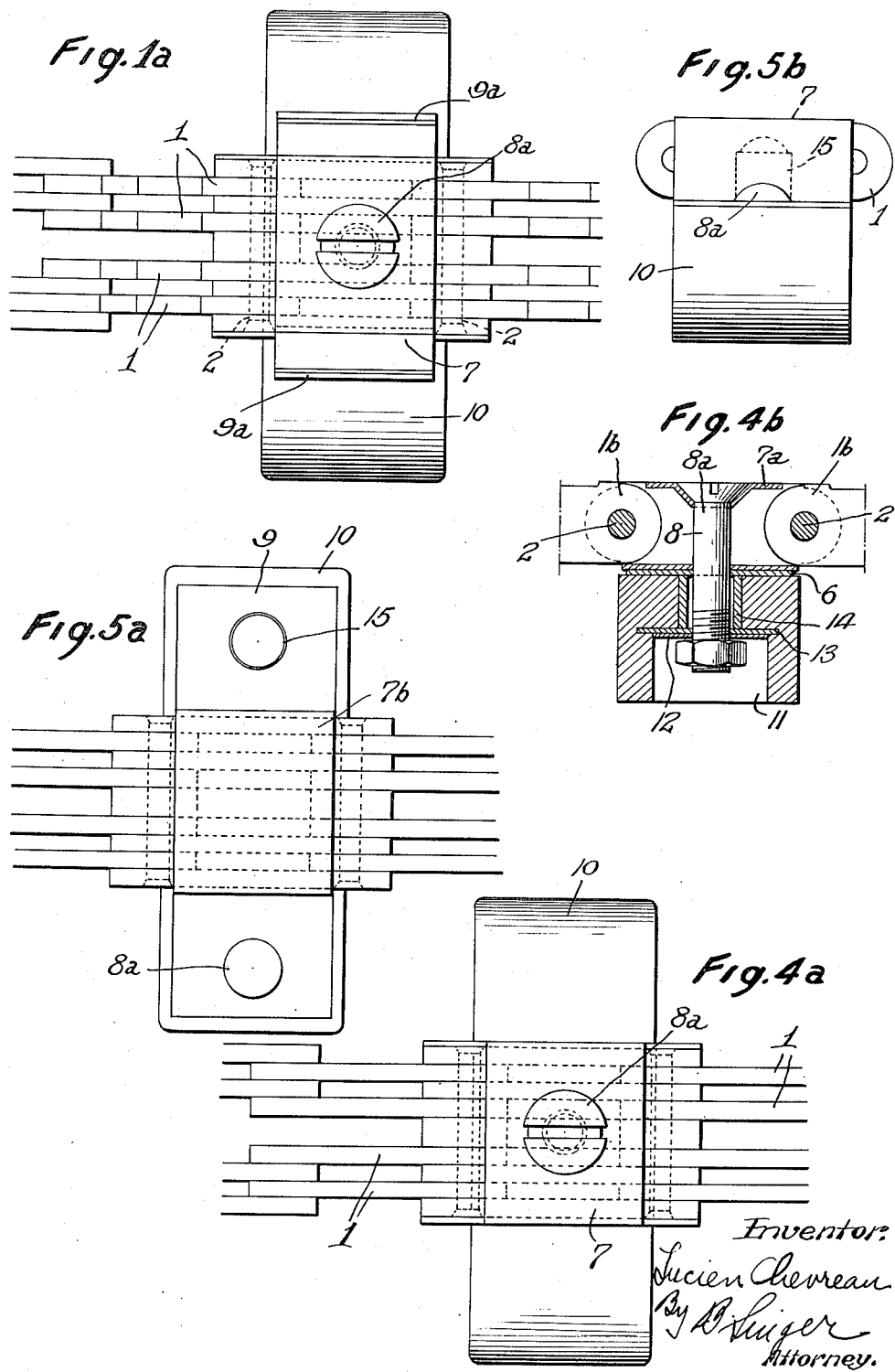

Patented Feb. 4, 1941

2,230,935

UNITED STATES PATENT OFFICE 2,230,935

ENDLESS CHAIN

Lucien Chevreau, Paris, France, assignor to Societe Industrielle d'Auteuil (Société Anonyme), Paris, France Application April 6, 1938, Serial No. 200,555
In France April 7, 1937

9 Claims. (Cl. 305—10)

The present invention relates to endless chains of the type commonly called "caterpillar" which serve to replace the wheels of vehicles.

Such endless chain structures are applicable to all vehicles, not only land vehicles of all kinds, and especially motor vehicles but also aquatic and amphibian vehicles, and also to mechanical conveyers and sport skates.

The present invention is more especially concerned with rolling endless chains of the type in which the various elements are free to pivot with respect to one another in both directions, the curvature of the chain in one direction being limited only by the fact that the various shoes or supporting elements assembled with the chain bear upon one another.

The chief object of the present invention is to provide an endless chain of the type above mentioned which is better adapted to meet the requirements of practice than chains of the same kind made up to the present time, especially from the point of view of simplicity and cheap construction, and, in particular which permits the fixation of the shoes to the chain through the intermediate of one or two bolts.

With these objects in view I have designed a chain construction the features of which will result from the following detailed description of some specific embodiments thereof.

Preferred embodiments of the present invention will result from the following description, with reference to the accompanying drawings, given merely by way of example, and in which:

Fig. 1a is a plan view of the portion of the endless chain shown by Fig. 1;

Fig. 4a is a plan view of the chain element shown by Fig. 4;

Fig. 4b is a longitudinal section of the embodiment of Figs. 4 and 4a;

Fig. 5a is a plan view of the chain element shown by Fig. 5;

Fig. 5b is a side elevational view of the embodiment of Fig. 5.

Figure 1:
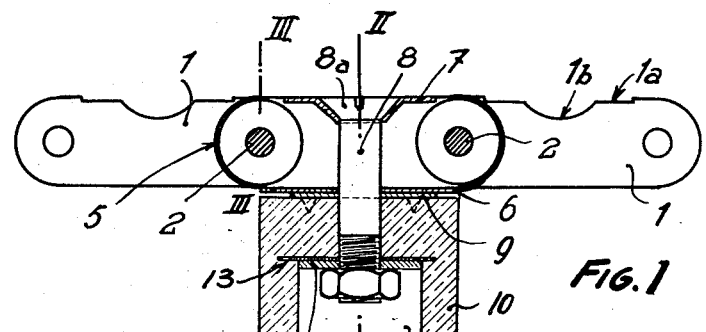
Fig. 1 is a sectional view of the endless chain according to the present invention, on the line I—I of Fig. 2.
Figure 2:
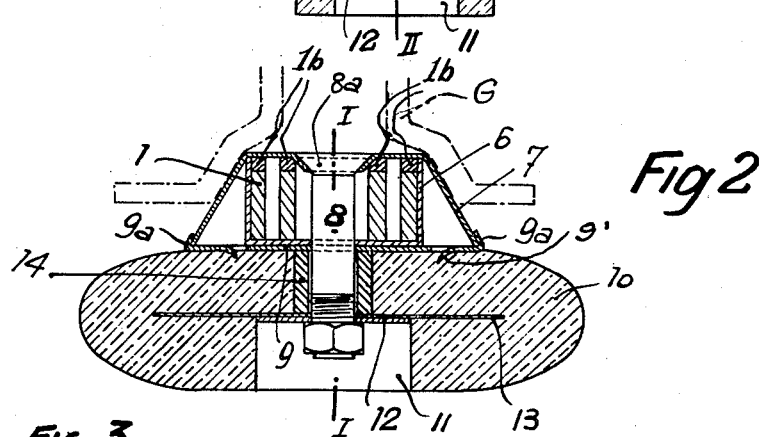
Fig. 2 is a sectional view of the same on the line II—II of Fig. 1.
Figure 3:
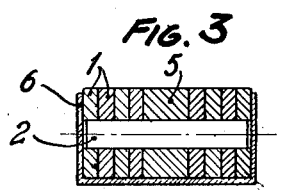
Fig. 3 is a sectional view of the same on the line III—III of Fig. 1.

The chain is made of sections each constituted by any number of link elements or link parts 1 (four in the example shown by the drawing) each pivotally connected at both ends to the adjacent link sections, through spindles 2, with the interposition of a spacing ring 5 of the usual type (as shown by Fig. 3).

According to an important characteristic of the present invention, said spindles 2 are kept in position by stirrup-shaped pieces 6 mounted about the external link parts 1 but independent thereof, before fixing the shoes in position.

In addition to their function of maintaining the spindles, these stirrup-shaped pieces 6 serve also to retain the lubricating grease in the joints.

The rubber or like shoes 10 are mounted on the chain ensured by means of pieces 7 having a horizontal portion applied against the chain. The external surface of this piece constitutes a guide for rollers G of corresponding shape, which bear upon the chain and are shown in dash-and-dot lines on the drawings.

A bolt 8 extends through said piece 7, stirrup-shaped piece 6, and a plate 9 interposed between the shoe and piece 6. This plate 9 is provided with cramps 9', which penetrate into the shoe proper 10. This piece 9 is further provided with a folded edge 9a, which prevents it, and the shoe, from pivoting with respect to piece 7.

Bolt 8 extends into a housing 11 provided in the shoe, inside which said bolt is tightly held against the interposed ring 12.

Piece 7 constitutes not only a guiding element but also a part of the roller track for rollers G. For this purpose the upper surface of said piece 7 must be located in the same plane as the upper edge of the links, which upper edge constitutes the other part of said roller track. These links are therefore provided with a notch 1a of a depth equal to the thickness of plate 7.

In order that the head 8a of bolt 9 may be also flush with the upper surface of plate 7, while being correctly maintained in position, this head is of conical shape and engages in a corresponding stamped portion of said plate. In order to provide a sufficient space for said stamped portion between the link parts. The internal link parts are provided with a notch 1b for accommodating said stamped part of plate 7 and the conical head 8a of bolt 9.

Also, it will be noted that in order to simplify the plant necessary for manufacturing the parts of the chain, the external link parts may also be provided with similar notches without any inconvenience.

In order that the bolts may be tightly secured against the shoe without involving any drawback, said shoe may be inwardly fitted with a plate 13 embedded in the mass and provided with holes in such manner that the molding of rubber can be performed in one operation for the whole mass.

In said mass, I may further provide a distance piece 14 which maintains the proper interval between plate 9 and plates 13, and which supports the tightening effort of the bolt or of a rivet playing the same part.

Figure 4:
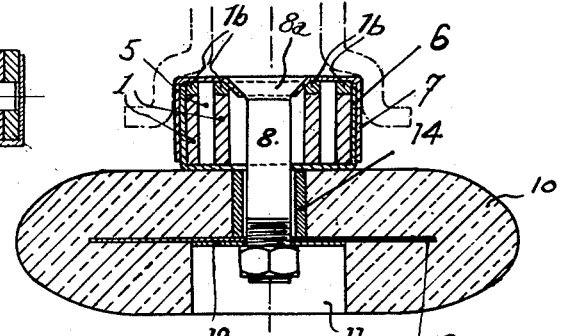
Fig. 4 is a view similar to Fig. 2, showing another embodiment of the invention.

When the endless chain is not intended to support considerable stresses, in particular when it is to be used in connection with sport skates, plate 9 with its cramps may be dispensed with, and in this case piece 7a is merely folded in the shape of a U, as shown by Fig. 4. It still cooperates as above explained with roller members Ga.

Figure 5:
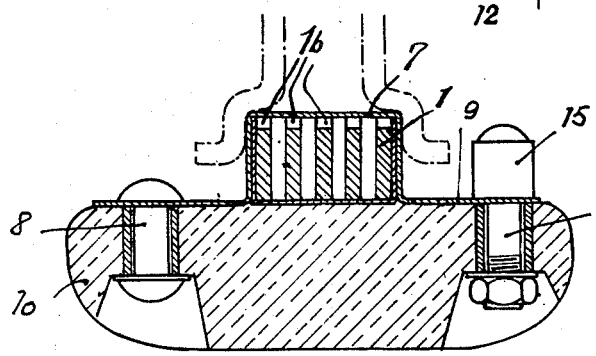
Fig. 5 is a view, similar to Fig. 2, of still another modification.

In other cases, especially when the structure is to be used as a driving chain, the central bolt or rivet 8 can be replaced by two lateral bolts or rivets 8a, 8'a, as shown by Fig. 5, the eventual driving teeth 15 (which are provided only when the chain is to be driven directly through said teeth) being located opposite the heads of the bolts, or rivets, piece 7b coacting with a roller member Gb.

Of course, the invention is applicable to chains cooperating with the support in any suitable manner, that is to say provided with tensioning rollers or the like, and in general mechanically mounted in any suitable manner.

It will be noted that the structure above described ensures a particularly simple and strong construction of the chain, and consequently permits of employing shoes of any width whatever, which may even be given the form of floats, for the construction of nautical apparatus.

In a general manner, while I have, in the above description, disclosed what I deem to be practical and efficient embodiments of the present invention it should be well understood that I do not wish to be limited thereto as there might be changes made in the arrangement, disposition and form of the parts without departing from the principle of the present invention as comprehended within the scope of the accompanying claims.

What I claim is:

1. An endless chain structure of the type described, which comprises, in combination, a chain made of jointed sections, each section whereof consists of a plurality of link parts arranged side by side, a shoe associated with each of said chain sections, a piece constituted by a bent plate bearing both upon the edges of the link parts of each chain section and upon the corresponding shoe, for holding said chain section and said shoe in proper relative position, and a bolt for securing said shoe to said chain section, said bolt being engaged through said shoe and said chain section, both provided with corresponding holes for it, said bent plate being shaped to act both as roller track and transverse guiding means for rollers cooperating with said endless chain structure, said link parts being provided with recesses for accommodating said bolt and being provided on at least one edge thereof with a notched portion for accommodating said bent plate.

2. An endless chain structure of the type described, adapted to be used in connection with rollers, which comprises, in combination, a chain made of jointed sections, each section whereof consists of a plurality of link parts arranged side by side, a spindle at each end of said chain section extending through all of said link parts, a stirrup-shaped member surrounding said chain section and applied against the ends of said spindles, a shoe associated with each of said chain sections, a piece constituted by a bent plate bearing upon both the edges of the link parts of each chain section and the corresponding shoe, for holding said chain section and said shoe in proper relative position, said link parts being notched on their edges so as to accommodate said bent plate which fits therein, and a bolt for securing said shoe to said chain section, extending through both of them, said bent plate being countersunk to accommodate the head of said bolt and being further shaped to act both as roller track and transverse guiding means for said rollers intended to cooperate with the endless chain structure.

3. An endless chain structure of the type described, adapted to be used in connection with rollers, which comprises, in combination, a chain made of jointed sections, each section whereof consists of a plurality of link parts arranged side by side, a spindle at each end of said chain section extending through all of said link parts, a stirrup-shaped member surrounding said chain section and applied against the ends of said spindles, adapted to retain lubricating grease, a shoe associated with each of said chain elements, a piece constituted by a bent plate bearing upon both the edges of the link parts of each chain section and the corresponding shoe, for holding said chain section and said shoe in proper relative position, said link parts being notched on their edges so as to accommodate said bent plate which fits therein, and a bolt for securing said shoe to said chain section, extending through both of them, said bent plate being countersunk to accommodate the head of said bolt and being further shaped to act both as roller track and transverse guiding means for said rollers intended to cooperate with the endless chain structure, and a plate held between said bent plate and said shoe and provided with projections adapted to engage into the matter of said shoe, for preventing rotation of said shoe with respect to said chain section, said second mentioned plate being provided with lateral abutments adapted to cooperate with said bent plate.

4. An endless chain structure according to claim 2, further including a small plate fitted in the mass of said shoe and a nut for tightening said bolt adapted to bear against said last mentioned plate.

5. An endless chain structure according to claim 2, further including a small plate mounted in the mass of said shoe, a nut for tightening said bolt adapted to bear against said last mentioned plate, and a distance piece mounted in the mass of said shoe, between said last mentioned plate and the upper face of said shoe, for maintaining the interval therebetween.

6. An endless chain structure of the type described, adapted to be used in connection with rollers, which comprises, in combination, a chain made of jointed sections, each section whereof consists of a plurality of link parts arranged side by side, a shoe associated with each of said chain sections, a piece constituted by a bent plate bearing upon each chain section and the corresponding shoe, for holding said chain section and said shoe in proper relative position, said bent plate having lateral wings bearing directly upon said shoe, and bolts for securing said shoe to said section, extending through said wings and the corresponding parts of said shoe, respectively, said bent plate being shaped to act both as roller track and transverse guiding means for said rollers intended to cooperate with the endless chain structure.

7. An endless chain structure according to claim 6, further including a driving tooth carried by said bent plate.

8. An endless chain structure of the type described adapted to be used in connection with rollers, which comprises, in combination, a chain made of jointed sections, a shoe associated with each chain section, a bent piece surrounding each chain section on the lateral sides and top thereof, a bolt extending through said shoe and said chain section having its head applied upon the top face of said bent piece, for securing said shoe to said chain section, and a plate held between said shoe and said chain section, said plate being provided with downward projections adapted to penetrate into the matter of said shoe for anchoring thereto, said bent piece being shaped to act both as roller track and transverse guiding means for said rollers intended to cooperate with the endless chain structure.

9. An endless chain structure of the type described adapted to be used in connection with rollers, which comprises, in combination, a chain made of jointed sections, each section consisting of a plurality of links arranged side by side, with pivot means for hinged connection with the group of links forming the next chain section, a shoe associated with each chain section, a bent piece surrounding the group of links which forms each chain section, on the lateral sides and top thereof, said links being notched at the top so that the bent piece houses in said notches and is flush with said top of the chain section, a bolt extending through said shoe and said chain section having its head applied upon the top face of said bent piece, for securing said shoe to said chain section, and a plate held between said shoe and said chain section, said plate being provided with downward projections adapted to penetrate into the matter of said shoe for anchoring thereto, said bent piece being shaped to act both as roller track and transverse guiding means for said rollers intended to cooperate with the endless chain structure.

LUCIEN CHEVREAU.